US011887323B2

(12) United States Patent
Chakravarty et al.

(10) Patent No.: US 11,887,323 B2
(45) Date of Patent: Jan. 30, 2024

(54) SELF-SUPERVISED ESTIMATION OF OBSERVED VEHICLE POSE

(71) Applicant: Ford Global Technologies, LLC, Dearborn, MI (US)

(72) Inventors: Punarjay Chakravarty, Campbell, CA (US); Tinne Tuytelaars, Korbeek-Lo (BE); Cédric Picron, Meise (BE); Tom Roussel, Heverlee (BE)

(73) Assignee: Ford Global Technologies, LLC, Dearborn, MI (US)

( * ) Notice: Subject to any disclaimer, the term of this patent is extended or adjusted under 35 U.S.C. 154(b) by 313 days.

(21) Appl. No.: 16/895,267

(22) Filed: Jun. 8, 2020

(65) Prior Publication Data
US 2021/0383167 A1 Dec. 9, 2021

(51) Int. Cl.
*G06T 7/70* (2017.01)
*G06N 3/08* (2023.01)
(Continued)

(52) U.S. Cl.
CPC .............. *G06T 7/70* (2017.01); *G06F 18/214* (2023.01); *G06N 3/08* (2013.01); *G06V 10/82* (2022.01);
(Continued)

(58) Field of Classification Search
CPC ...... G06K 9/6256; G06K 9/6255; G06N 3/08; G06N 3/04; G06T 7/70; G06T 7/73;
(Continued)

(56) References Cited

U.S. PATENT DOCUMENTS

| 10,475,208 B1* | 11/2019 | Morrison | G06T 7/001 |
| 11,276,189 B2* | 3/2022 | Niesen | G06N 3/0454 |

(Continued)

FOREIGN PATENT DOCUMENTS

CN  108898628 A  11/2018

OTHER PUBLICATIONS

D. Jayaraman and K. Grauman, "Learning Image Representations Tied to Ego-Motion," 2015 IEEE International Conference on Computer Vision (ICCV), 2015, pp. 1413-1421, doi: 10.1109/ICCV.2015.166. (Year: 2015).*

(Continued)

*Primary Examiner* — Sean M Conner
(74) *Attorney, Agent, or Firm* — Frank A. MacKenzie; Bejin Bieneman PLC

(57) ABSTRACT

A method may include: receiving a first image captured by a camera at a first time instance, wherein the first image includes at least a portion of an observed vehicle; determining a first ray angle based on a coordinate system of an ego-vehicle and a coordinate system of the observed vehicle corresponding to the first image; receiving a second image captured by the camera at a second time instance, wherein the second image includes at least a portion of the observed vehicle oriented at a different viewpoint; determining a second ray angle based on a coordinate system of the ego-vehicle and the coordinate system of the observed vehicle corresponding to the second image; determining a local angle difference based on the first ray angle and the second ray angle; and training a deep neural network using the local angle difference, the first image, and the second image.

16 Claims, 14 Drawing Sheets

(51) Int. Cl.
*G06V 20/58* (2022.01)
*G06V 10/82* (2022.01)
*G06F 18/214* (2023.01)

(52) U.S. Cl.
CPC ............ *G06V 20/58* (2022.01); *G06V 20/584* (2022.01); *G06T 2207/10024* (2013.01); *G06T 2207/20081* (2013.01); *G06T 2207/20084* (2013.01); *G06T 2207/30252* (2013.01)

(58) Field of Classification Search
CPC . G06T 2207/10024; G06T 2207/20081; G06T 2207/20084; G06T 2207/20088; G06T 2207/30252; G06T 2207/30248; G06T 2207/30256
USPC .................. 382/103–104, 100, 106–107
See application file for complete search history.

(56) References Cited

U.S. PATENT DOCUMENTS

| | | | |
|---|---|---|---|
| 2006/0165277 A1* | 7/2006 | Shan .................... | G06V 10/255 |
| | | | 382/104 |
| 2012/0114181 A1 | 5/2012 | Borthwick et al. | |
| 2015/0084755 A1* | 3/2015 | Chen ...................... | G08G 1/16 |
| | | | 340/435 |
| 2017/0169300 A1* | 6/2017 | Heisele ................ | G06T 7/74 |
| 2018/0129917 A1* | 5/2018 | Chu ...................... | G06V 20/48 |
| 2020/0020117 A1 | 1/2020 | Daehler et al. | |
| 2020/0097742 A1* | 3/2020 | Ratnesh Kumar ... | G06N 3/0472 |
| 2020/0241538 A1* | 7/2020 | Hansen ................ | G08G 1/146 |
| 2021/0070286 A1* | 3/2021 | Green .................. | G05D 1/0088 |
| 2021/0125036 A1* | 4/2021 | Tremblay ................ | G06N 3/08 |
| 2021/0149971 A1* | 5/2021 | Duan .................... | G06N 3/084 |
| 2021/0150757 A1* | 5/2021 | Mustikovela .......... | G06V 20/56 |
| 2021/0335007 A1* | 10/2021 | Zhang ...................... | G06T 7/80 |

OTHER PUBLICATIONS

A. Mousavian, D. Anguelov, J. Flynn and J. Košecká, "3D Bounding Box Estimation Using Deep Learning and Geometry," 2017 IEEE Conference on Computer Vision and Pattern Recognition (CVPR), 2017, pp. 5632-5640, doi: 10.1109/CVPR.2017.597. (Year: 2017).*

Anonymous ECCV Submission, Paper ID 1692, "What My Motion tells me about Your Pose: Self-Supervised Fine-Tuning of Observed Vehicle Orientation Angle".

* cited by examiner

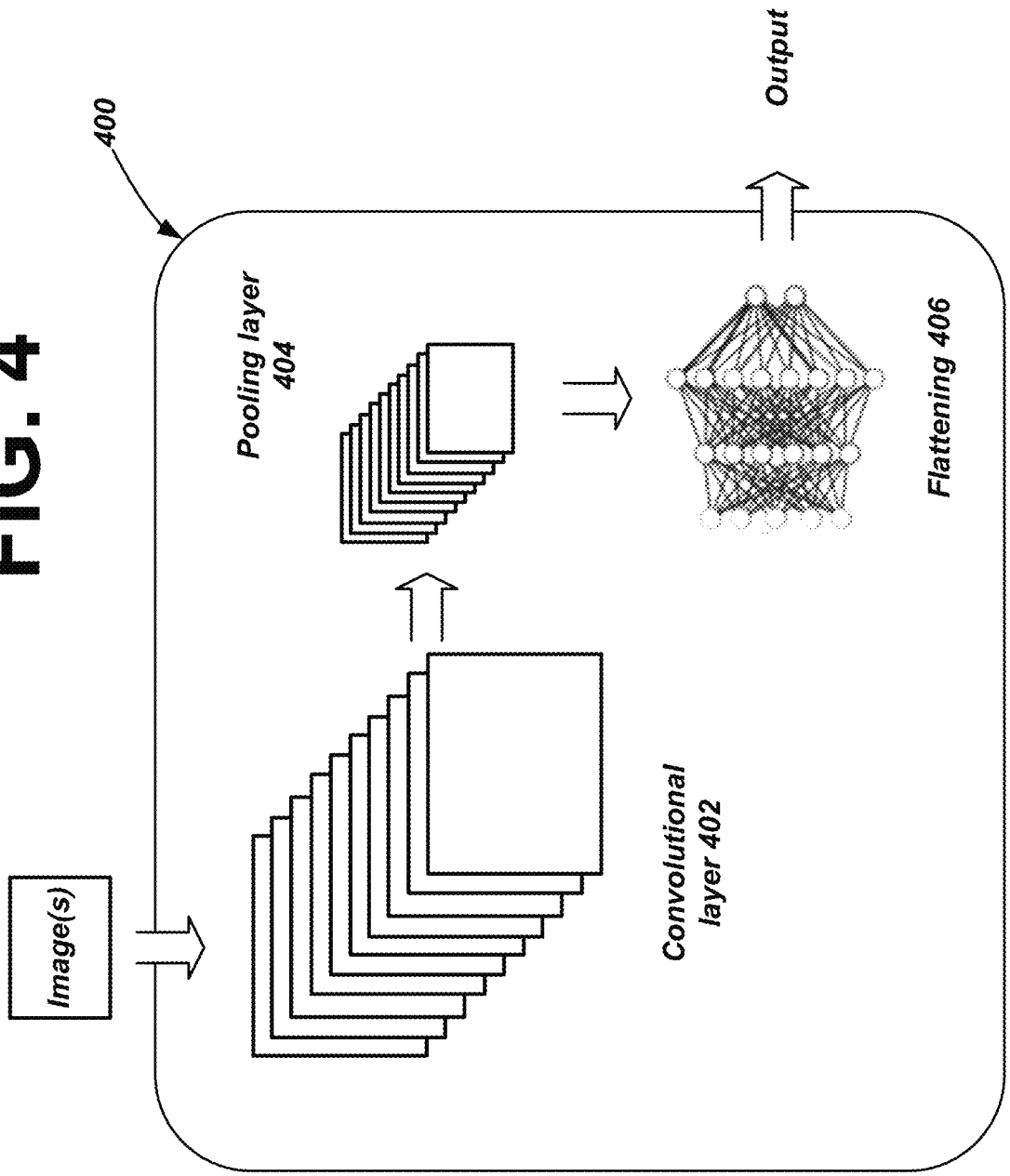

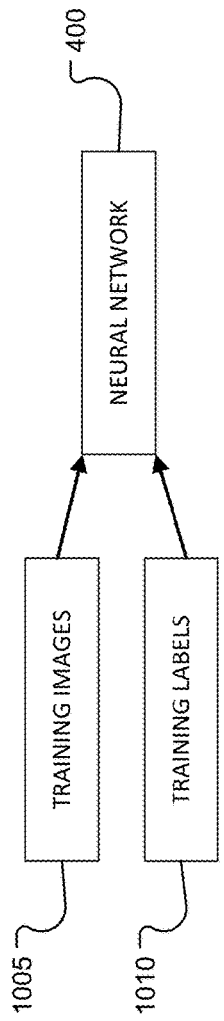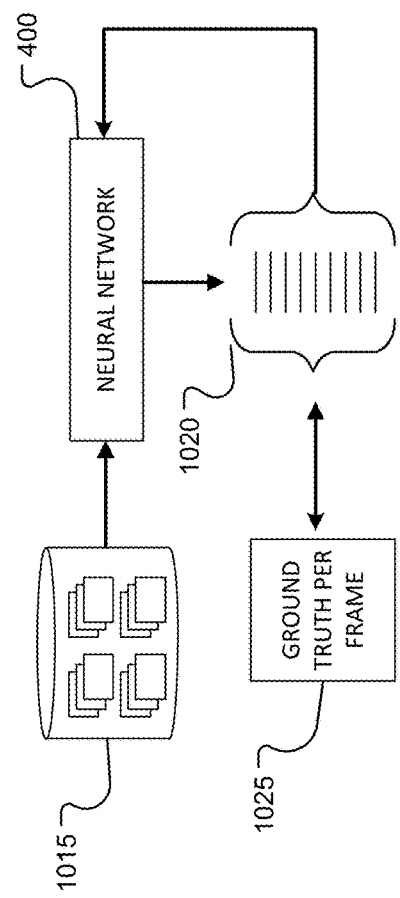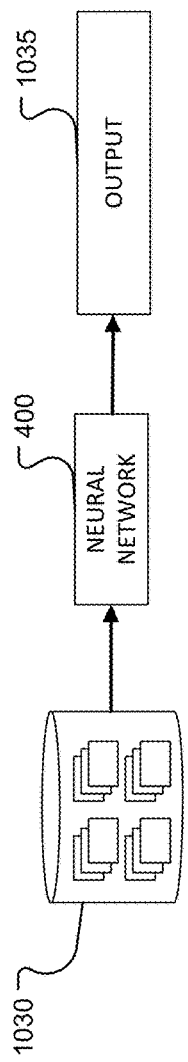

SELF-SUPERVISED ESTIMATION OF OBSERVED VEHICLE POSE

BACKGROUND

Deep neural networks (DNNs) can be used to perform many image understanding tasks, including classification, segmentation, and captioning. Typically, DNNs require large amounts of training images (tens of thousands to millions). Additionally, these training images typically need to be annotated for the purposes of training and prediction.

BRIEF DESCRIPTION OF THE DRAWINGS

FIG. 4 is a diagram of an example deep neural network.

FIGS. 10A through 10C are diagrams for training a deep neural network via a supervised training process.

DETAILED DESCRIPTION

Figure 1:
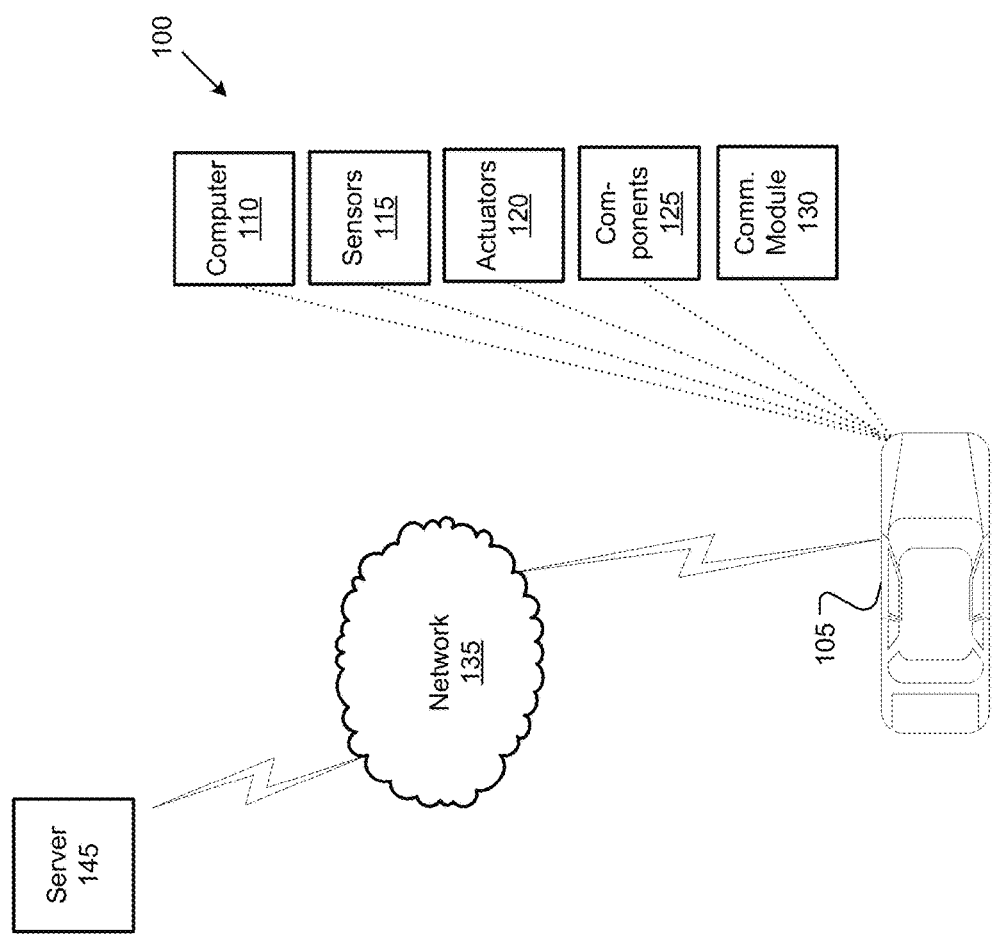
FIG. 1 is a diagram of an example system for training a deep neural network.

A system can include a computer including a processor and a memory, the memory including instructions such that the processor is programmed to: receive a first image captured by a camera at a first time instance, wherein the first image includes at least a portion of an observed vehicle; determine a first ray angle based on a coordinate system of an ego-vehicle and a coordinate system of the observed vehicle corresponding to the first image; receive a second image captured by the camera at a second time instance, wherein the second image includes at least a portion of the observed vehicle oriented at a different viewpoint; determine a second ray angle based on a coordinate system of the ego-vehicle and the coordinate system of the observed vehicle corresponding to the second image; determine a local angle difference based on the first ray angle and the second ray angle; and train a deep neural network using the local angle difference, the first image, and the second image.

In other features, the processor is further programmed to: receive vehicle odometry data; and determine a local angle difference based on the first ray angle, the second ray angle, and the vehicle odometry data.

In other features, the deep neural network comprises a convolutional neural network.

In other features, the deep neural network comprises a Siamese neural network.

In other features, the Siamese neural network comprises a first convolutional neural network and a second convolutional neural network.

In other features, the Siamese neural network determines a first local angle based on a first color image and a second local angle based on a second color image and determines a contrastive loss based on a difference between the first local angle and the second local angle.

In other features, the processor is further programmed to: update the deep neural network based on the contrastive loss.

In other features, the processor is further programmed to: update at least one weight associated with a neuron of the deep neural network based on the contrastive loss.

In other features, the camera comprises a monocular camera.

In other features, the processor is further programmed to: calculate, via the trained deep neural network, a yaw component corresponding to the observed vehicle based on at least one of the first image or the second image.

In other features, the processor is further programmed to: calculate, via the trained deep neural network, a pitch component, a roll component, an x-component, a y-component, and a z-component corresponding to the observed vehicle based on at least one of the first image or the second image.

A method includes receiving a first image captured by a camera at a first time instance, wherein the first image includes at least a portion of an observed vehicle; determining a first ray angle based on a coordinate system of an ego-vehicle and a coordinate system of the observed vehicle corresponding to the first image; receiving a second image captured by the camera at a second time instance, wherein the second image includes at least a portion of the observed vehicle oriented at a different viewpoint; determining a second ray angle based on a coordinate system of the ego-vehicle and the coordinate system of the observed vehicle corresponding to the second image; determining a local angle difference based on the first ray angle and the second ray angle; and training a deep neural network using the local angle difference, the first image, and the second image.

In other features, the method includes receiving vehicle odometry data; and determining a local angle difference based on the first ray angle, the second ray angle, and the vehicle odometry data.

In other features, the deep neural network comprises a convolutional neural network.

In other features, the deep neural network comprises a Siamese neural network.

In other features, the Siamese neural network comprises a first convolutional neural network and a second convolutional neural network.

In other features, the Siamese neural network determines a first local angle based on a first color image and a second local angle based on a second color image and determines a contrastive loss based on a difference between the first local angle and the second local angle.

In other features, the method includes updating the deep neural network based on the contrastive loss.

A system includes a computer including a processor and a memory, the memory including instructions such that the processor is programmed to: receive, at a trained deep neural network, an image including at least a portion of an observed vehicle; and determine, via the trained deep neural network, a local orientation angle of the observed vehicle based on the image, wherein the trained deep neural network comprises a Siamese neural network including an activated neural network and a deactivated neural network, wherein the activated deep neural network determines the local orientation angle of the observed vehicle.

In other features, the processor is further programmed to: calculate, via the trained deep neural network, a yaw component, a pitch component, a roll component, an x-component, a y-component, and a z-component corresponding to the observed vehicle based on the local orientation angle and the image.

The present disclosure provides a system and a method for training a deep neural network to calculate and output a multi-degree-of-freedom (MDF) pose of a vehicle. The training of the deep neural network is based on input images captured by at least a forward-facing camera within an ego-vehicle. The present system and method may train the deep neural network without accurately labeled training data as obtaining and/or generating accurately labeled training data may be cost-intensive and time-consuming.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
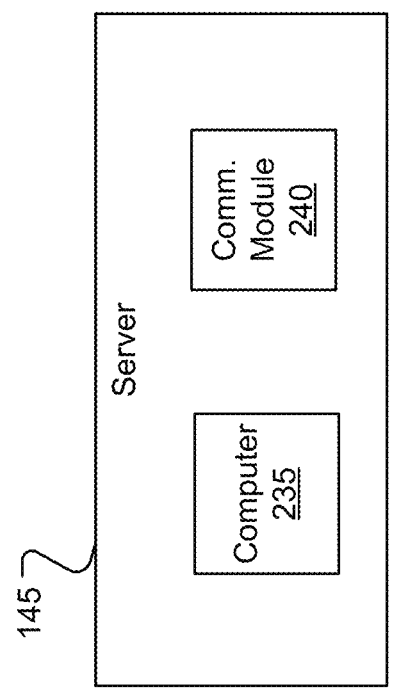
FIG. 2 is a diagram of an example server within the system.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3B:
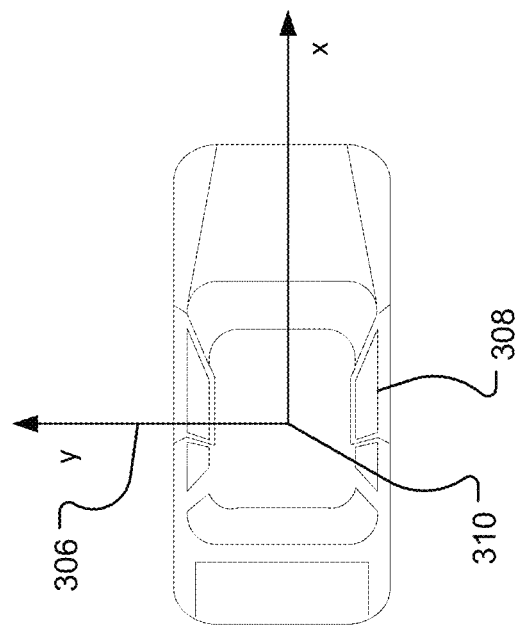
FIGS. 3A and 3B are example diagrams representing coordinate systems of an ego-vehicle and an observed vehicle
Figure 3A:
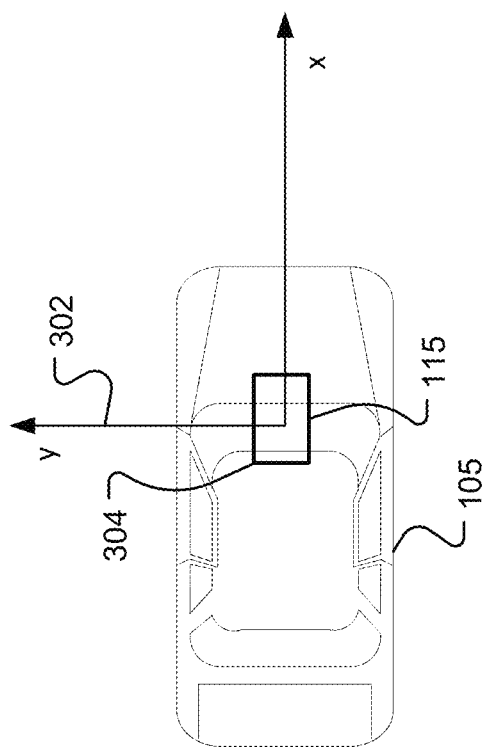

FIG. 3A is an example diagram of a coordinate system 302 corresponding to the vehicle 105, e.g., an ego-vehicle. As shown, the coordinate system 302 is centered about a sensor 115 of the vehicle 105. In an example implementation, the sensor 115 may be a camera 304 oriented to capture images representing a forward-facing environment with respect to the vehicle 105. In an example implementation, the camera 304 may be a monocular camera. The images may comprise Red-Green-Blue (RGB) images.

FIG. 3B illustrates an example diagram of a coordinate system 306 corresponding to a vehicle 308 detectable by one or more sensors 115 of the vehicle 105. As shown, the coordinate system 306 is centered about a center 310 of a vehicle body of the vehicle 308. Within the present context, a positive X-axis of the coordinate systems 302, 306 can be defined as oriented along a forward-facing direction of the vehicles 105, 308, a positive Y-axis can be defined as oriented along a left-side, e.g., driver's side, of the vehicles 105, 308. A positive Z-axis can be defined as oriented into FIGS. 3A and 3B. As described herein, the computer 110 determines a yaw component of a multi-degree-of-freedom (MDF) pose of a vehicle, such as the observed vehicle 308. The yaw component is determined by estimating a ray angle and a local angle based on suitable image processing techniques.

FIG. 4 is a diagram of an example deep neural network 400 that determines one or more components of the MDF pose of a vehicle 308. The deep neural network 400 can be a software program that can be loaded in memory and executed by a processor in the vehicle 105 and/or the server 145, for example. The MDF pose can comprise six (6) components, including an x-component, a y-component, a z-component, a pitch component, a roll component, and a yaw component, where the x-, y-, and z-components are translations according to a Cartesian coordinate system, e.g., coordinate systems 302, 306 (comprising the X-axis, the Y-axis, and the Z-axis) and the roll, pitch, and yaw components are rotations about X-, Y-, and Z-axes, respectively.

As explained below, a sensor 115, such as the camera 304 can capture one or more images that include at least a portion of the vehicle 308, and the computer 110, using the deep neural network 400, may determine the multi-degree-of-freedom (MDF) pose of the vehicle 308—e.g., a six-degree-of-freedom (6DOF) pose. Once the deep neural network 400 is trained, using the image(s) and this MDF pose information, the computer 110 may determine the vehicle's position with respect to the detected vehicle 308, as well as waypoint data by which to instruct the vehicle 105 to navigate. For example, using the MDF pose of a detected, e.g., observed, vehicle 308, the computer 110 can employ lane changing processes, situation mitigation processes, lane keeping processes. It is understood that the computer 110 may use other neural networks for operating the vehicle 105 based on the estimated MDF pose.

In an example implementation, the deep neural network 400 may comprise a convolutional neural network (CNN). In this implementation, the deep neural network 400 can be adapted to classify vehicle pose based on captured image data (e.g., as inputs to the CNN). The deep neural network 400 may comprise a convolutional layer 402, a pooling layer 404, and flattening layer 406. The convolutional layer 402 may receive image frames and convolve the image frames using a kernel or filter—e.g., yielding a plurality of convolved features. Thereafter, the pooling layers 404 may reduce the spatial size of the convolved features. Typically (although not required), there may exist multiple iterations of convolution followed by pooling. Thereafter, flattening layer 406 may convert the pooling output to a suitable column vector for input to a neural network, wherein classification occurs (e.g., using at least one predetermined neural network function, e.g., such as SoftMax)—the classification in the instant example pertaining to MDF pose.

In some instances, the input image frames comprise multiple images depicting one or more portions of the detected vehicle 308 from different perspectives as the vehicle 105 traverses a path. In some instances, the image frames may be stitched together based on images captured by multiple cameras, e.g., sensors 115, deployed throughout the vehicle 105. The computer 110 may perform the stitching prior to providing the images as input to the deep neural network 400.

Figure 5:
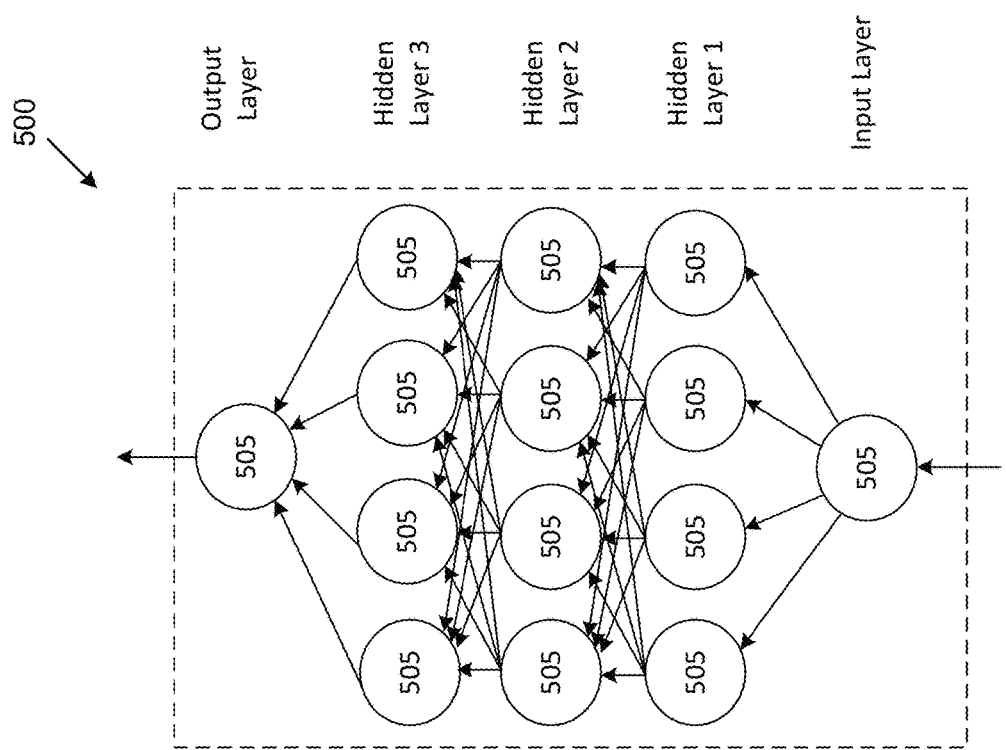
FIG. 5 is another diagram of the example deep neural network.

FIG. 5 is a diagram of an example deep neural network (DNN) 500, such as the deep neural network 400. The DNN 500 may be representative of the deep neural network architectures described within the present disclosure. The DNN 500 includes multiple nodes 505, and the nodes 505 are arranged so that the DNN 500 includes an input layer, one or more hidden layers, and an output layer. Each layer of the DNN 500 can include a plurality of nodes 505. While FIG. 5 illustrates three (3) hidden layers, it is understood that the DNN 500 can include additional or fewer hidden layers. The input and output layers may also include more than one (1) node 505.

The nodes 505 are sometimes referred to as artificial neurons 505, because they are designed to emulate biological, e.g., human, neurons. A set of inputs (represented by the arrows) to each neuron 505 are each multiplied by respective weights. The weighted inputs can then be summed in an input function to provide, possibly adjusted by a bias, a net input. The net input can then be provided to activation function, which in turn provides a connected neuron 505 an output. The activation function can be a variety of suitable functions, typically selected based on empirical analysis. As illustrated by the arrows in FIG. 5, neuron 505 outputs can then be provided for inclusion in a set of inputs to one or more neurons 505 in a next layer.

The DNN 500 can be trained to accept data as input and generate an output based on the input. In some implementations, the DNN 500 can be trained with ground truth data, i.e., data about a real-world condition or state. For example, the DNN 500 can be trained with ground truth data or updated with additional data by a processor. Weights can be initialized by using a Gaussian distribution, for example, and a bias for each node 505 can be set to zero. Training the DNN 500 can including updating weights and biases via suitable techniques such as backpropagation with optimizations. Ground truth data can include, but is not limited to, data specifying objects within an image or data specifying a physical parameter, e.g., angle, speed, distance, or angle of object relative to another object. Based on the received images captured by the various cameras within the vehicle 105, the deep neural network 400 estimates the MDF pose of the detected vehicle 308. For instance, the deep neural network 400 can estimate an orientation, e.g., yaw component, of the detected vehicle 308 relative to the vehicle 105.

Figure 6:
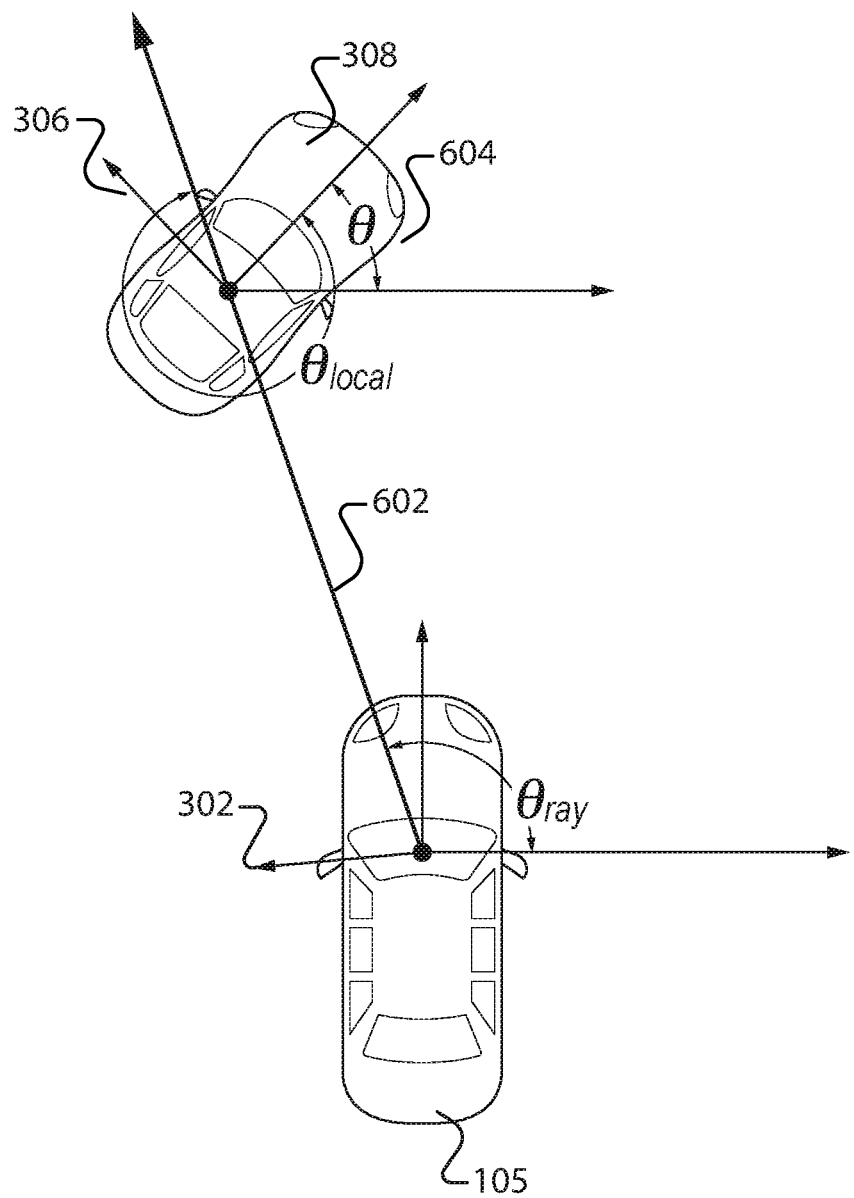
FIGS. 6 through 9 are diagrams for determining a ray angle and a local angle based on a path of the ego-vehicle relative to the observed vehicle.

Referring to FIG. 6, the orientation theta, e.g., orientation angle, of the observed vehicle relative to the ego-vehicle can be decomposed into two angles—a ray angle (θray) and local angle (θlocal). For instance, a ray 602 of the camera 304 extends along the ground plane from the origin of the vehicle 105, e.g., ego-vehicle coordinate system 302, which is aligned with the camera 304 center, and intersects with the origin of the observed vehicle 308 coordinate system 306, which is centered on the vehicle body of the vehicle 308. The ray angle is defined as the angle that is created with the ray 602 subtends with the negative Y-axis of the vehicle 308. The computer 110 can determine the ray angle analytically based on the calibrated camera 304 and a center of a two-dimensional (2D) bounding box within an image plane of the camera 304. For example, suitable object detection and classification techniques may be used to define the 2D bounding box about the observed vehicle 308.

The local angle is defined as the angle between the ray 602 and the observed vehicle 308 coordinate system 306. The computer 110 estimates local angle differences based on at least two images captured by the camera 304 at two different time instances. The local angle differences can then be provided to the DNN 400 for training purposes. For instance, the DNN 400 may receive the images and the local angle differences as input for the purposes of updating one or more weights. The ray angle and the local angle constitute an orientation angle (θ), which is referenced as angle 604, of the observed vehicle 308.

Figure 7:
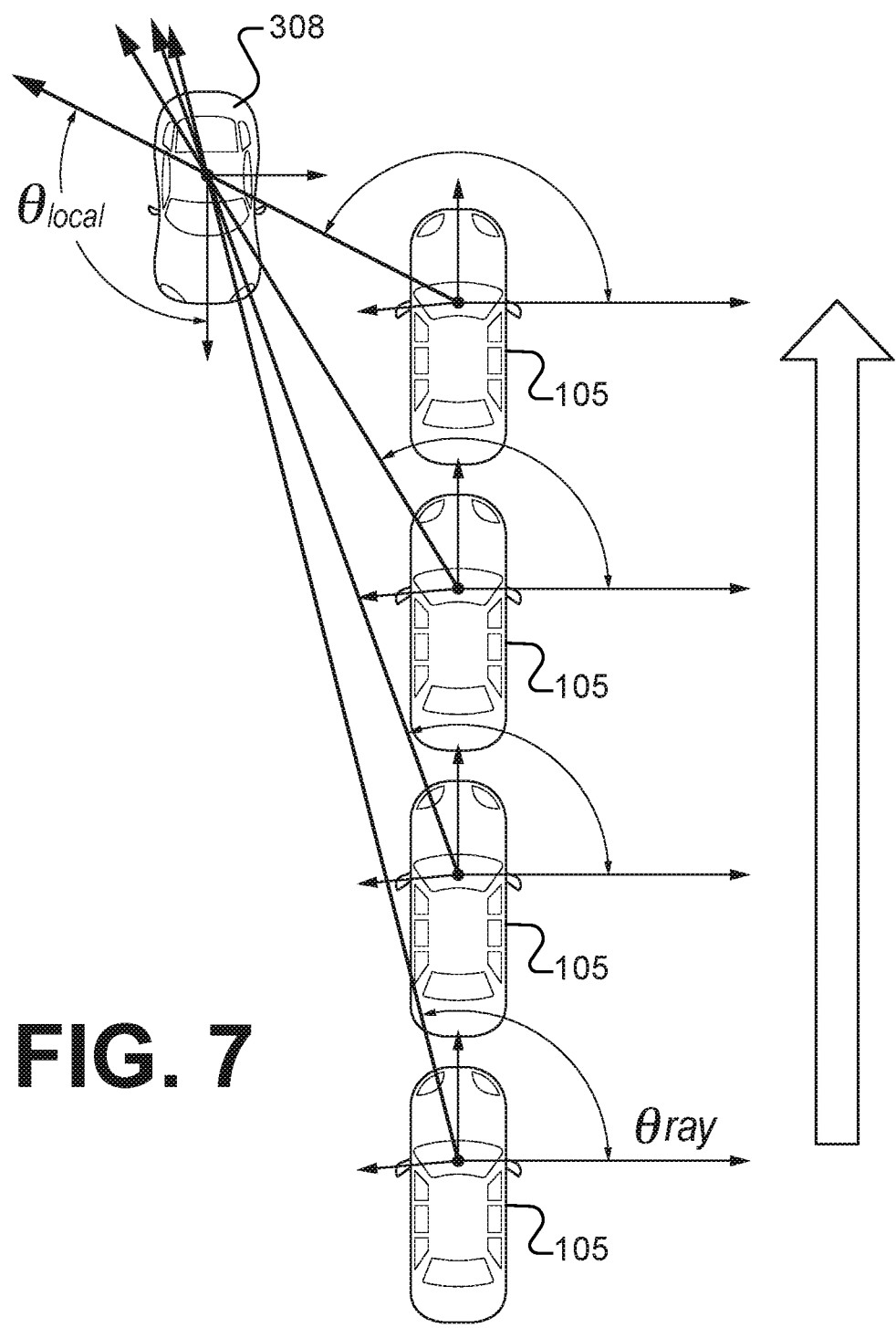

FIG. 7 illustrates an example path traversed by the vehicle 105 relative to the observed vehicle 308. In this example, the vehicle 308 may be stationary. As the vehicle 105 traverses the path, the ray angle increases and the local angle decreases. Based on the various calculated ray angles and local angle, the computer 110 can continually calculate the orientation angle of the observed vehicle 308.

Figure 8:
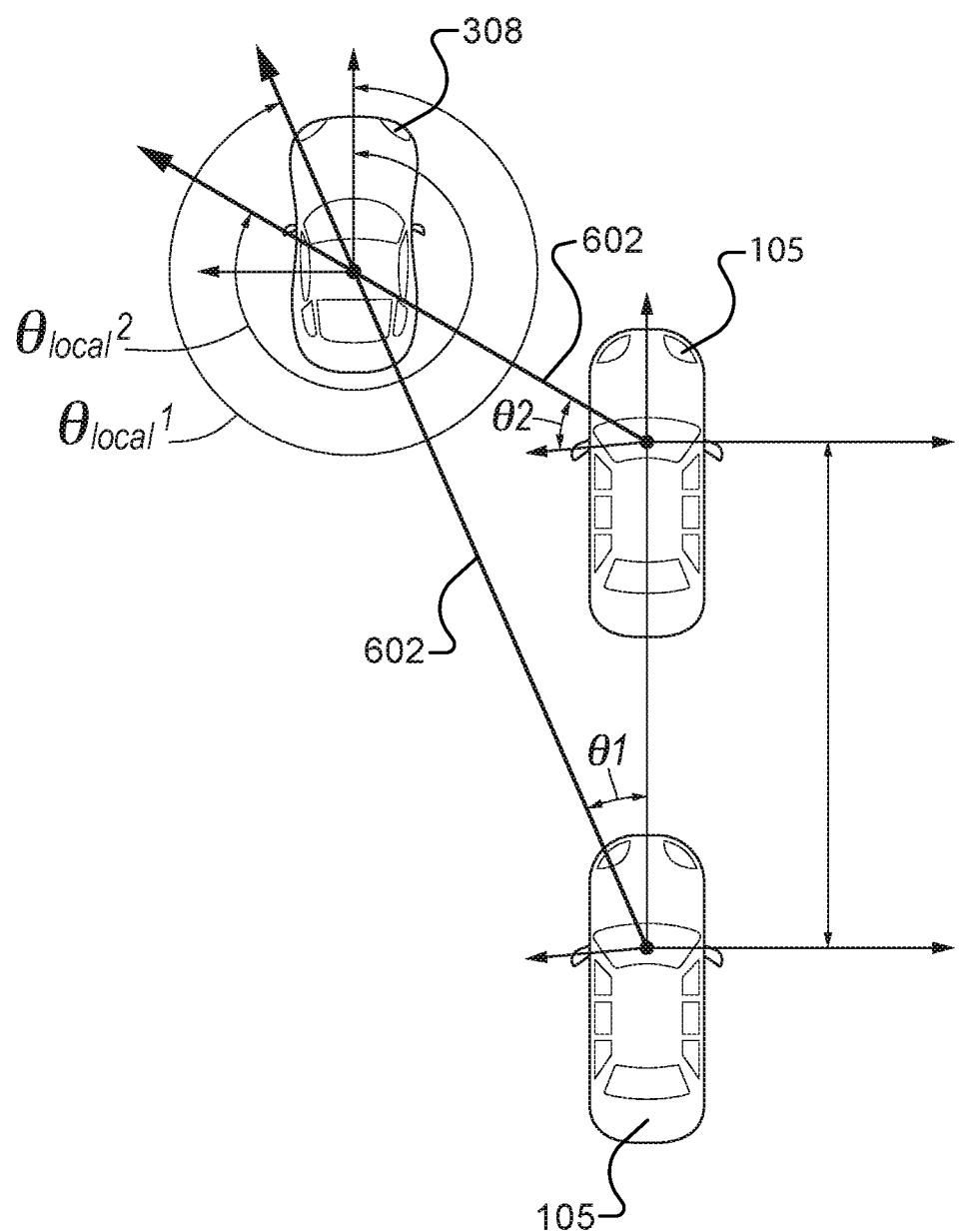
Figure 9:
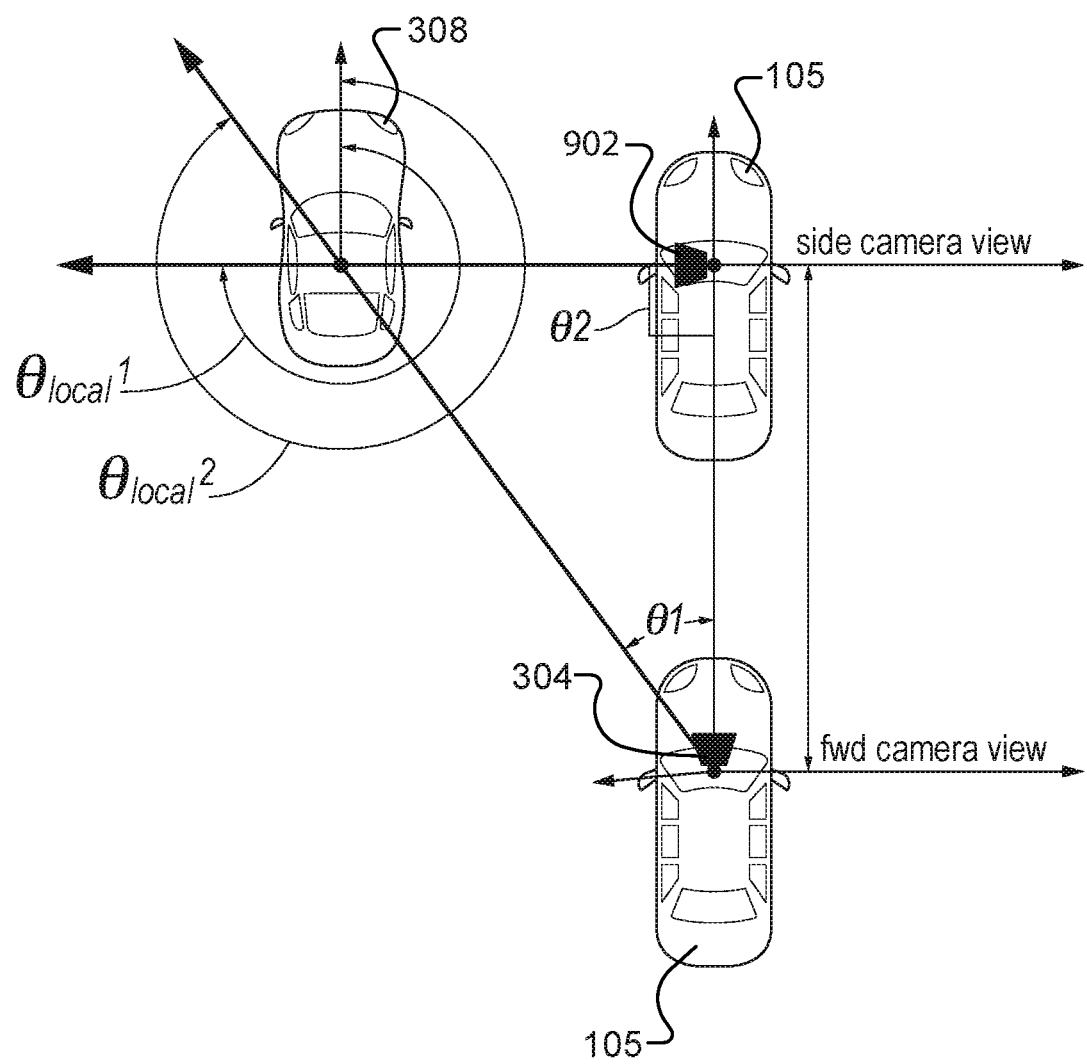

FIG. 8 illustrates another diagram in which the vehicle 105 is traversing a path relative to a stationary vehicle 308. The motion of the vehicle 105 relative to the vehicle 308 is used to train the deep neural network 400. In an example implementation, odometry, such as visual odometry or odometry provided by one or more sensors 115, can be used to estimate vehicle 105 motion, which provide a pose change of the vehicle 105 as it travels relative to the vehicle 308. Visual odometry can be calculated based on the captured images representing the forward-facing environment of the vehicle 105. The estimated motion can include a distance traveled by the vehicle 105 and the angle difference of its heading vector. The computer 110 can use the estimated motion and the ray angles, e.g., θ1 and θ2, are used to determine the difference in the local angles, e.g., θlocal1 and θlocal2, of the vehicle 308. As described above, the corresponding ray angles and the local angles constitute the orientation angle of the observed vehicle 308. FIG. 9 illustrates another diagram in which images captured by the camera 304 and a side-view camera 902, e.g., sensor 115. The side-view camera 902 may provide images that are offset by ninety degrees (90°) with respect to the images captured by the camera 304. In this implementation, the image offsets provide an additional constraint for the deep neural network 400 since the image offset for the images is known.

During training of the deep neural network 400, the camera 304 of the vehicle 105 captures multiple images representing various viewpoints of the observed vehicle 308. As the observed vehicle 308 is stationary, the change in local angle is caused solely by the change in the coordinate axis system 302 of the vehicle 105 due to the motion of the vehicle 105. The computer 110 uses the input images to estimate the ray angle. Using the estimated ray angle and the odometry data, the computer 110 determines a relative difference between local angles of the observed vehicle 308. Using the estimated local angle, the computer 110 can determine the orientation angle of the observed vehicle 308 based on the ray angle and the orientation angle.

The deep neural network 400 may be trained via a supervised training process or a self-supervised training process. In an example implementation, FIGS. 10A and 10B illustrate an example process for training the DNN 400 in accordance with one or more implementations of the present disclosure. As shown in FIG. 10A, during an initial training phase, a DNN 400 receives a set of labeled training images (e.g., training images 1005 and training labels 1010). The training images 1005 may depict objects within a field-of-view (FOV) of a vehicle camera. The training labels 1010 may comprise object labels, object types, and/or local angles corresponding to the observed vehicle 308. In some instances, lidar sensor 115 data can be used as ground-truth. After the initial training phase, at a supervised training phase, a set of N training images 1015 are input to the DNN 400. The DNN 400 generates outputs indicative of the local angles for each of the N training images 1015, FIG. 10B illustrates an example of generating output for one training image 1015, such as a non-labeled training image, of the N training images 1015. Based on the initial training, the DNN 400 outputs a vector representation 1020 of the local angles of the observed vehicle 308 based on the motion of the vehicle 105. The vector representation 1020 is compared to the ground-truth data 1025. The DNN 400 updates network parameters based on the comparison to the ground-truth boxes 1025. For example, the network parameters, e.g., weights associated with the neurons, may be updated via backpropagation. The DNN 400 may be trained at the server 145 and provided to the vehicle 105 via the communication network 135. The vehicle 105 may also provide data captured by the vehicle 105 systems to the server 145 for further training purposes.

After training, the DNN 400 may be used to estimate local angles corresponding to the received images as shown in FIG. 10C. The output of the DNN 400 is a local angle and/or that the computer 110 can use to calculate the orientation angle and/or the MDF pose of the observed vehicle 308.

Figure 11:
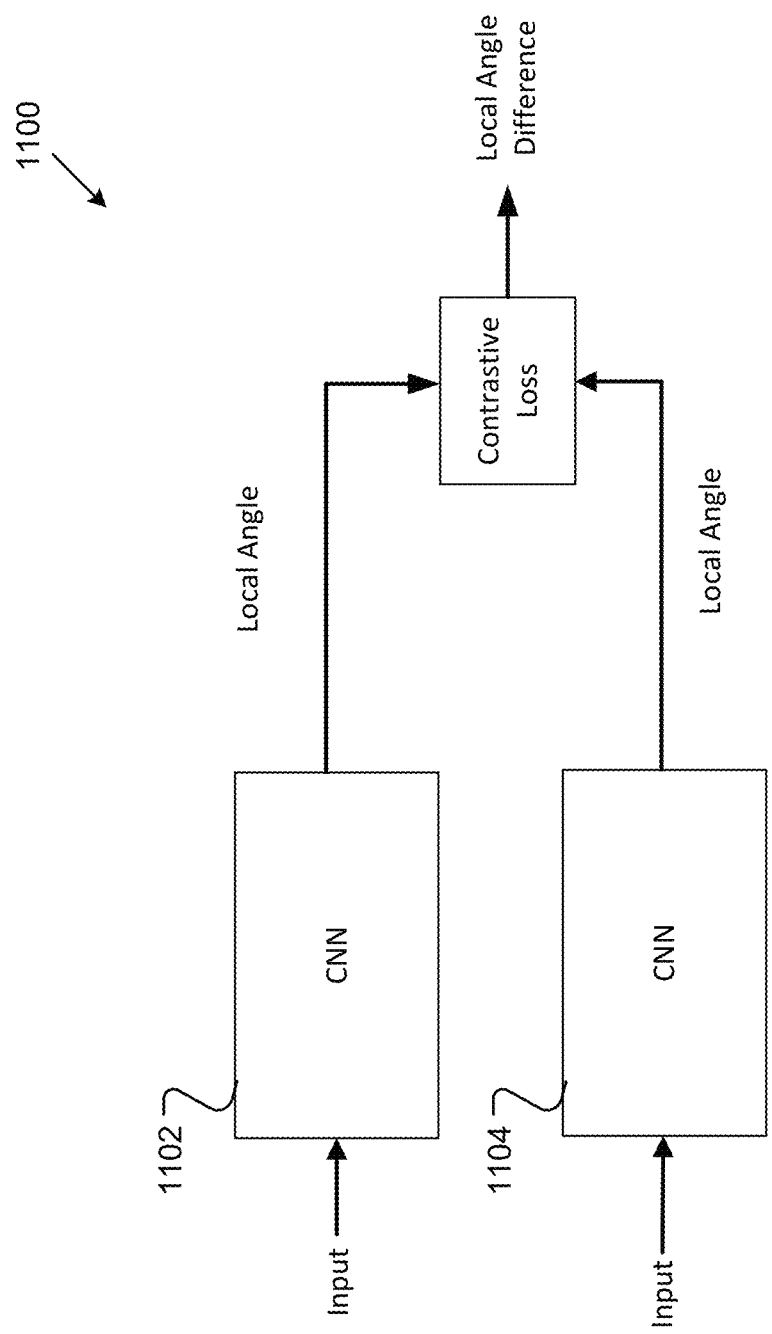
FIGS. 11 and 12 are diagrams for training an example deep neural network via a self-supervised training process.

FIG. 11 illustrates an example implementation of self-supervised training for the DNN 400. As shown, the DNN 400 can comprise a Siamese neural network 1100 that includes a first CNN 1102 and a second CNN 1104. The CNNs 1102, 1104 can comprise the include the same weights to provide for comparison purposes between the outputs of the CNNs 1102, 1104. The weights may be updated based on data representing the relative local angle differences calculated by the computer 110. The CNNs 1102, 1104 each receive input that may comprise the same image frame or a similar image frame. A similar frame may be defined as another image of the observed vehicle 308 captured by another camera, e.g., sensor 115, of the vehicle 105 that corresponds to the image frame captured by the camera 304. e.g., an image of the observed vehicle 308 captured at the same time instance.

Each CNN 1102, 1104 outputs an estimated local angle based on the respective input. The estimated local angles are provided to a contrastive loss function 1106, and the contrastive loss function 1106 generates a local angle difference representing a difference between the estimated local angles output by the CNNs 1102, 1104. The local angle difference is compared with an estimated local angle value generated by the computer 110 based on the motion of the vehicle 105. The comparison can be used to update the weights of the CNNs 1102, 1104 for training purposes. Once trained, a single CNN 1102, 1104 may be used to generate an estimated absolute local angle based on the input images of the observed vehicle 308 at various time intervals.

It is contemplated that the DNN 400 can also calculate the other components of the MDF pose of the observed vehicle 308 using similar processes described above, e.g., using the ray angles and odometry data to determine local angle differences. For example, the local yaw component and the local pitch component for the MDF pose can be determined based on one or more input images representing the observed vehicle at various time intervals. During testing of the DNN 400, it is contemplated that the DNN 400 uses at least one image to output the local angle of the observed vehicle 308. In some instances, the DNN 400 uses a single image to determine the local angle of the observed vehicle 308.

Figure 12:
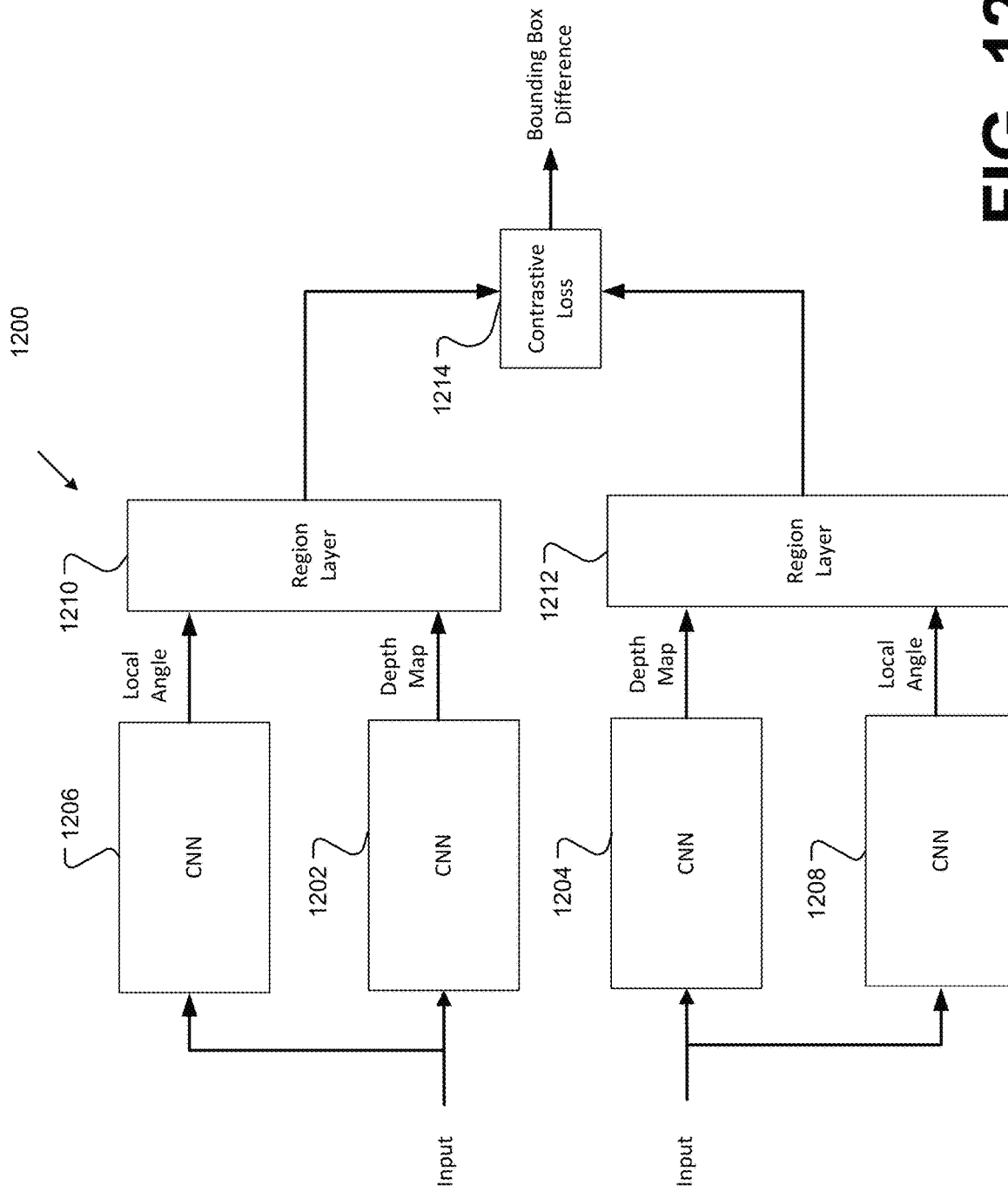

FIG. 12 illustrates an example implementation of self-supervised training for the DNN 400. As shown, the DNN 400 can comprise a Siamese neural network 1200 that includes a first CNN 1202, a second CNN 1204, a third CNN 1206, and a fourth CNN 1208. The CNNs 1202, 1204 may comprise CNNs that output a depth map based on the respective received depth images. The depth images may be captured by one or more vehicle 105 sensors 115. The CNNs 1206, 1208 comprise CNNs similar to CNNs 1102, 1104 that output an estimated local angle based on the respective received images.

The Siamese neural network 1200 also includes region layers 1210, 1212 that receive the depth maps and estimated local angles from CNNs 1202, 1206 and CNNs 1204, 1208 respectively. The region layers 1210, 1212 each generate a three-dimensional (3D) bounding box based on the corresponding input. The 3D bounding boxes can be positioned about the vehicle 308 along the ray 602 of the camera 304 at a distance estimated based on the depth map. The region layers 1210, 1212 can each rotate the generated 3D bounding box.

A contrastive loss function 1214 can receive the 3D bounding boxes generated by region layers 1210, 1212 to generate a 3D bounding box difference representing a difference between the generated bounding boxes. The comparison can be used to update the weights of the CNNs 1202, 1204, 1206, 1208 for training purposes. Once trained, the 3D bounding boxes can used to generate the X-component, the Y-component, and the Z-component for the MDF pose.

Figure 13:
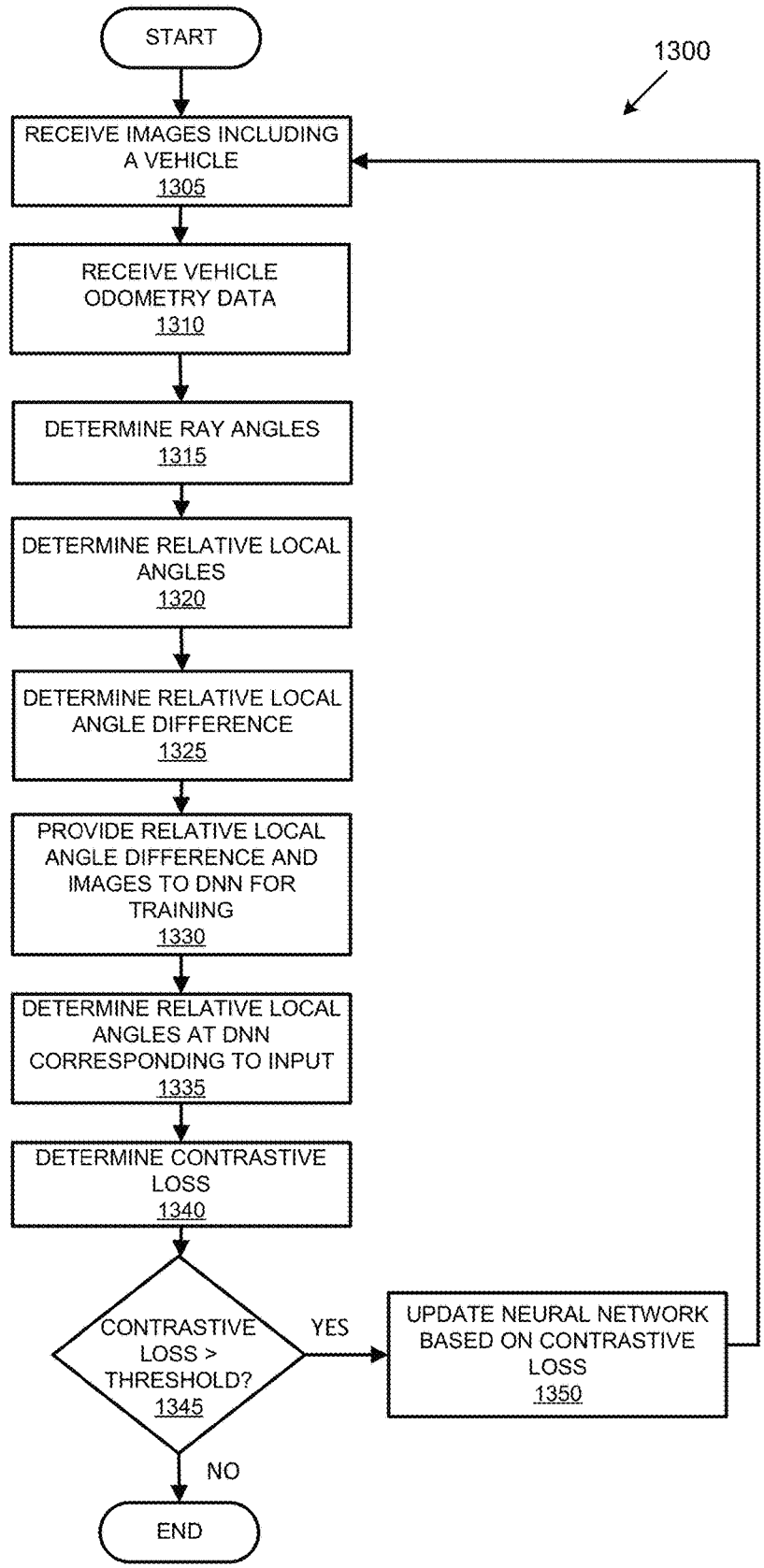
FIG. 13 is a flow diagram illustrating an example process for training a deep neural network.

FIG. 13 is a flowchart of an exemplary process 1300 for training a deep neural network, such as the deep neural network 400. Blocks of the process 1300 can be executed by the computer 110 or the computer 235. The process 1300 begins at block 1305 in which at least two images captured at two different time instances are received. Each image includes at least a portion of an observed vehicle is received. At block 1310, odometry for the vehicle 105 is received. In an example implementation, the computer 110 can determine odometry data for the vehicle 105 based on the received image or receive odometry measurements from internal measurement devices, e.g., sensors 115. The vehicle odometry can indicate an estimated change in position of the vehicle 105 from one image to another and an angle difference of the vehicle's 105 heading vector. At block 1315, ray angles of the vehicle 105 is determined based on the odometry corresponding to the images and/or the images. At block 1320, relative local angles for the observed vehicle are determined based on the ray angles and the odometry data. At block 1325, the difference between the relative local angles is determined. The relative local angle difference and the input images are provided to a deep neural network at block 1330 for training purposes. At block 1335, the deep neural network determines a first relative local angle and a second relative local angle corresponding to the input images.

At block 1340, a contrastive loss between the first relative local angle and the second relative local angle is determined. At block 1345, a determination is made whether the contrastive loss output is greater than a predetermined error threshold. If the contrastive loss output is less than or equal to the predetermined error threshold, the process 1300 ends. Otherwise, the deep neural network is updated using the contrastive loss output at block 1340 and the process 1300 returns to block 1305. For instance, one or more weights associated with the nodes, such as nodes 505, of the deep neural network 400 are updated via suitable techniques such as backpropagation with optimizations.

Figure 14:
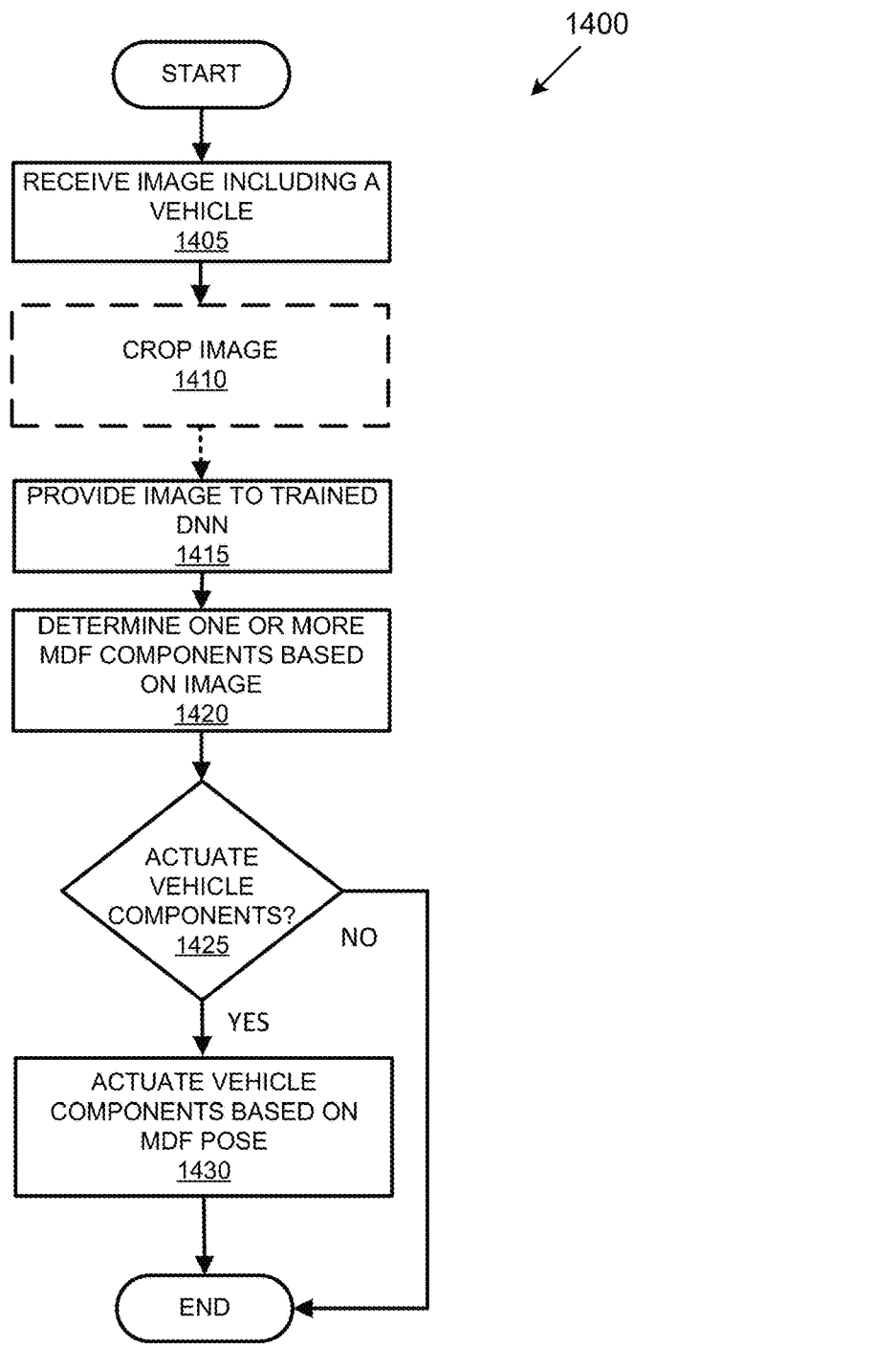
FIG. 14 is a flow diagram illustrating an example process for determining one or more multi-degree-of-freedom (MDF) pose components of an observed vehicle using a trained deep neural network.

FIG. 14 is a flowchart of an exemplary process 1400 for determining an MDF pose of a vehicle via a trained deep neural network, such as the deep neural network 400. Blocks of the process 1400 can be executed by the computer 110. The process 1400 begins at block 1405 in which an image depicting a portion of an observed vehicle is received. At block 1410, the computer 110 may crop the received image. At block 1415, the image is provided to a trained deep neural network.

At block 1420, the trained deep neural network determines one or more MDF components corresponding to the observed vehicle. In an example implementation, after training, the deep neural network 400 may use only one path of the Siamese neural network 1100 or Siamese neural network 1200 for determining an observed vehicles 308 MDF pose components. For instance, either the CNN 1102 or the CNN 1104 may be deactivated in the Siamese neural network 1100 after training. In another instance, either the pair of CNNs 1202, 1206 or the pair of CNNs 1204, 1208 may be deactivated in the Siamese neural network 1200 after training. Thus, the activated path of either the Siamese neural network 1100 or the Siamese neural network 1200 is used for determining MDF pose components after training.

At block 1425, a determination is made whether to actuate one or more of the vehicle 105 components based on the determined MDF pose of the observed vehicle 308. For instance, the computer 110 may determine whether to actuate one or more components of the vehicle 105 in order to alter a vehicle 105 speed, a vehicle 105 acceleration, a vehicle 105 direction, or the like. At block 1430, if there is a determination to actuate one or more vehicle 105 components, the computer 110 issues one or more commands to actuate the corresponding vehicle 105 components. The process 1400 then ends. If the determination is that no vehicle 105 actuation is needed, the process 1400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a,"

"the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
   receive a first image captured by a camera at a first time instance, wherein the first image includes at least a portion of an observed vehicle;
   determine a first ray angle based on a coordinate system of an ego-vehicle and a first coordinate system of the observed vehicle based on the first image;
   receive a second image captured by the camera at a second time instance, wherein the second image includes at least a portion of the observed vehicle oriented at a different viewpoint;
   determine a second ray angle based on the coordinate system of the ego-vehicle and a second coordinate system of the observed vehicle based on the second image;
   receive vehicle odometry data;
   determine a local angle difference based on the first ray angle, the second ray angle, and the vehicle odometry data; and
   train a deep neural network using the local angle difference, the first image, and the second image to output a position of the ego-vehicle with respect to the observed vehicle for operating the ego-vehicle,
   wherein the deep neural network comprises a Siamese neural network and wherein the Siamese neural network determines a first local angle based on a first color image and a second local angle based on a second color image and determines a contrastive loss based on a difference between the first local angle and the second local angle.

2. The system of claim 1, wherein the deep neural network comprises a convolutional neural network.

3. The system of claim 1, wherein the Siamese neural network comprises a first convolutional neural network and a second convolutional neural network.

4. The system of claim 1, wherein the processor is further programmed to:
   update the deep neural network based on the contrastive loss.

5. The system of claim 4, wherein the processor is further programmed to:
   update at least one weight associated with a neuron of the deep neural network based on the contrastive loss.

6. The system of claim 1, wherein the camera comprises a monocular camera.

7. The system of claim 1, wherein the processor is further programmed to:
   calculate, via the trained deep neural network, a yaw component corresponding to the observed vehicle based on at least one of the first image or the second image.

8. The system of claim 7, wherein the processor is further programmed to:
   calculate, via the trained deep neural network, a pitch component, a roll component, an x-component, a y-component, and a z-component corresponding to the observed vehicle based on at least one of the first image or the second image.

9. A method comprising:
   receiving a first image captured by a camera at a first time instance, wherein the first image includes at least a portion of an observed vehicle;
   determining a first ray angle based on a coordinate system of an ego-vehicle and a first coordinate system of the observed vehicle based on the first image;
   receiving a second image captured by the camera at a second time instance, wherein the second image includes at least a portion of the observed vehicle oriented at a different viewpoint;
   determining a second ray angle based on the coordinate system of the ego-vehicle and a second coordinate system of the observed vehicle based on the second image;
   receiving vehicle odometry data;
   determining a local angle difference based on the first ray angle, the second ray angle, and the vehicle odometry data; and
   training a deep neural network using the local angle difference, the first image, and the second image to output a position of the ego-vehicle with respect to the observed vehicle for operating the ego-vehicle,
   wherein the deep neural network comprises a Siamese neural network and wherein the Siamese neural network determines a first local angle based on a first color image and a second local angle based on a second color image and determines a contrastive loss based on a difference between the first local angle and the second local angle.

10. The method of claim 9, wherein the deep neural network comprises a convolutional neural network.

11. The method of claim 9, wherein the Siamese neural network comprises a first convolutional neural network and a second convolutional neural network.

12. The method of claim 9, further comprising:
    updating the deep neural network based on the contrastive loss.

13. The method of claim 12, further comprising:
    updating at least one weight associated with a neuron of the deep neural network based on the contrastive loss.

14. The method of claim 9, wherein the camera comprises a monocular camera.

15. The method of claim 9, wherein the processor is further programmed to:
    calculate, via the trained deep neural network, a yaw component corresponding to the observed vehicle based on at least one of the first image or the second image.

16. The method of claim 9, wherein the processor is further programmed to:
    calculate, via the trained deep neural network, a pitch component, a roll component, an x-component, a y-component, and a z-component corresponding to the observed vehicle based on at least one of the first image or the second image.

* * * * *